United States Patent
Kessler et al.

(10) Patent No.: US 9,751,367 B2
(45) Date of Patent: Sep. 5, 2017

(54) METHOD FOR TRANSMITTING A RADIO SIGNAL BETWEEN AN ELECTRONIC UNIT OF A VEHICLE WHEEL AND AN ELECTRONIC CENTRALIZED CONTROL UNIT ATTACHED TO THE VEHICLE

(71) Applicants: CONTINENTAL AUTOMOTIVE FRANCE, Toulouse (FR);
CONTINENTAL AUTOMOTIVE GMBH, Hannover (DE)

(72) Inventors: Sebastien Kessler, Dremil-Lafage (FR);
Nicolas Guinart, Toulouse (FR);
Mohamed Cheikh, Toulouse (FR)

(73) Assignees: CONTINENTAL AUTOMOTIVE FRANCE, Toulouse (FR);
CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/125,831

(22) PCT Filed: Mar. 13, 2015

(86) PCT No.: PCT/EP2015/000560
§ 371 (c)(1),
(2) Date: Sep. 13, 2016

(87) PCT Pub. No.: WO2015/135660
PCT Pub. Date: Sep. 17, 2015

(65) Prior Publication Data
US 2017/0001485 A1 Jan. 5, 2017

(30) Foreign Application Priority Data
Mar. 14, 2014 (FR) ...................... 14 52115

(51) Int. Cl.
*B60C 23/08* (2006.01)
*B60C 23/06* (2006.01)
*B60C 23/04* (2006.01)

(52) U.S. Cl.
CPC ........ *B60C 23/061* (2013.01); *B60C 23/0437* (2013.01); *B60C 23/0459* (2013.01);
(Continued)

(58) Field of Classification Search
CPC .................................................. B60C 23/061
See application file for complete search history.

(56) References Cited

U.S. PATENT DOCUMENTS 5,808,190 A 9/1998 Ernst
6,112,587 A 9/2000 Oldenettel
(Continued)

FOREIGN PATENT DOCUMENTS

FR 2 919 415 A1 1/2009
FR 2 964 345 B1 3/2012
(Continued)

OTHER PUBLICATIONS

International Search Report, dated Jul. 14, 2015, from corresponding PCT application.

*Primary Examiner* — Joseph Feild
*Assistant Examiner* — Pameshanand Mahase
(74) *Attorney, Agent, or Firm* — Young & Thompson

(57) ABSTRACT

Method for transmitting a radio signal between a moving electronics unit of a wheel and a fixed central electronic control unit of the vehicle, includes:
defining an angular reference point of the wheel;
defining a division of one wheel revolution into successive basic sectors, and transmitting successive radio signals between the two units so that each signal is transmitted at a calculated predetermined wheel angular position;

(Continued)

calculating the angular rotation speed of the wheel;
determining a minimum wheel rotation sector required for the transmission time of a signal between the two units, at the calculated angular rotation speed;
determining an angular offset of transmission between a first and a second following signal, with respect to the angular reference point, as being equal to the smallest multiple of the basic division sector which covers the time required for transmission of the first radio signal at the calculated angular rotation speed.

16 Claims, 2 Drawing Sheets

(52) U.S. Cl.
CPC ........ B60C 23/0489 (2013.01); B60C 23/064 (2013.01); B60C 23/08 (2013.01)

(56) References Cited

U.S. PATENT DOCUMENTS

| | | |
|---|---|---|
| 6,435,020 B1 | 8/2002 | Oldenettel et al. |
| 7,010,968 B2 * | 3/2006 | Stewart ............... B60C 23/0444 73/146 |
| 2008/0231436 A1 | 9/2008 | Costes |
| 2012/0014632 A1 * | 1/2012 | Nishikawa ............ G01L 5/0019 384/448 |
| 2012/0253590 A1 | 10/2012 | Fink |
| 2012/0259507 A1 * | 10/2012 | Fink .................... B60C 23/0489 701/32.7 |
| 2013/0179113 A1 | 7/2013 | Guinart |
| 2013/0282225 A1 | 10/2013 | Gerardiere |
| 2014/0007683 A1 | 1/2014 | Guinart et al. |
| 2014/0019003 A1 | 1/2014 | Guinart et al. |
| 2014/0019035 A1 | 1/2014 | Fink et al. |
| 2014/0176323 A1 | 6/2014 | Kim |
| 2015/0057878 A1 * | 2/2015 | Friel ................... B60C 23/0416 701/34.4 |
| 2015/0233711 A1 | 8/2015 | Guinart |
| 2015/0306925 A1 | 10/2015 | Fudulea |

FOREIGN PATENT DOCUMENTS

| | | |
|---|---|---|
| FR | 2 985 014 A1 | 6/2013 |
| KR | 101 344 283 B1 | 12/2013 |
| WO | 2011/085878 A1 | 7/2011 |

* cited by examiner

METHOD FOR TRANSMITTING A RADIO SIGNAL BETWEEN AN ELECTRONIC UNIT OF A VEHICLE WHEEL AND AN ELECTRONIC CENTRALIZED CONTROL UNIT ATTACHED TO THE VEHICLE

The present invention relates to a method for transmitting a radio signal between a moving wheel electronics unit of a vehicle and a fixed central electronic control unit, abbreviated in English to "ECU", of said vehicle.

At the present time, wheel electronics units have the functionality of informing the central electronic control unit of various parameters relating to the wheel, such as the tire pressure, the gas temperature inside the tire, or wheel temperature, and the contact patch of the tire on the ground, for example the length of this contact patch in the plane of the wheel. These wheel electronics units are generally fitted to each wheel of the vehicle and fixed inside the tire against its tread, and are provided with means for detecting the moment when the tread comes into contact with the ground and the moment when it departs from it, on the basis of the induced radial displacement of the tread. These means are, for example, an accelerometer or an impact sensor or the like, associated with the wheel electronics unit, which measures, in the case of an accelerometer for example, the difference in radial acceleration when the tread comes into contact with the ground and departs from this contact.

Each wheel electronics unit transmits radio signals (generally at high frequency) to the central electronic control unit so that the latter can inform the driver of any abnormal measured parameters, and so that this central electronic control unit can also locate the position of each wheel unit on the vehicle during the life of the tire associated with the wheel, even if the position of the wheel on the vehicle is changed.

During the rotation of a wheel, and during one revolution of the wheel, there are generally parts of trajectories of the wheel electronics unit in which no transmission takes place, these parts being called signal non-transmission areas or shadow areas, corresponding to areas where there is a break in signal transmission. This may occur, in a different and unpredictable way, in each wheel of the same vehicle. By convention, however, there is a limited acceptance of the number and duration of the shadow areas for one wheel revolution. For example, a maximum shadow area of about 10° per wheel revolution is generally accepted. In certain special cases, this number may increase to two shadow areas, each covering a maximum of about 10°, per wheel revolution.

A TPMS (for "Tire Pressure Monitoring System" in English) consists in the transmission of radio signals between the wheel electronics units and the central electronic control unit. For example, the wheel electronics units have information messages to transmit to the central electronic control unit. An information message must be transmitted within a specified period. A complete message is transmitted in a radio signal sent once only; this signal is also called a "frame". According to a known example of a TPMS protocol, in order to ensure correct reception of an information message by the central electronic control unit, a train of three identical successive signals is transmitted, the information message to be transmitted being present in each of these signals. A train of identical signals is also called a "burst". Each frame of the burst therefore contains a complete information message to be transmitted. According to the example of a TPMS protocol described, a plurality of trains or bursts is transmitted, these bursts usually being identical in their content but possibly including different data due, notably, to the updating of certain parameters such as the tire pressure. Each successive train or burst of the plurality of bursts is sent with an interval of about one minute, in steady running mode. Also according to the example of a TPMS protocol described, the period between the frames of the same burst is generally fixed. The period between the frames of the same burst is also called the interframe gap.

In the direction of transmission from a wheel electronics unit toward the central electronic control unit, the message transmitted by the wheel electronics unit is validated (i.e. received by the central electronic control unit) if at least one of the three signals or frames of the train is received in full, that is to say without entering a shadow area. In other words, a signal or a frame is lost if part of it extends into a shadow area. The message is lost if the three signals or frames of the burst are lost.

There is a known document, WO2011/085878, which relates to the transmission of information between a wheel unit of a vehicle and a central electronic control unit of this vehicle, at a specified angular position of the wheel.

There is also a known document, KR101344283, which relates to the location of a vehicle wheel, by a central electronic control unit of the vehicle, using a transmission pattern dedicated to one wheel and enabling the central electronic control unit to recognize the source of the transmission pattern. The transmission pattern uses a division of the wheel into sectors in order to determine the angle of each transmission of a signal of the pattern. A module for detecting the rotation of the wheel, such as an ABS system or the like, indicates the angle of rotation of the wheel in order to identify the transmission sector on the basis of a fixed angular reference point.

If the radio transmission performance on the vehicle is optimal for the transmission of signals between the wheel unit and the central electronic control unit, that is to say if there is no shadow area in the course of one wheel revolution, and if 100% of the signals are received by the central electronic control unit, the standard protocol as described above therefore has an energy efficiency of only 33% per signal train, because, in all cases, only one received signal out of the three is useful.

However, a vehicle without a shadow area, and in which the reception rate reaches 100%, is not representative of reality. This explains the redundancy in the protocol, for example the use of three successive signals per signal train sent, for the purpose of ensuring a statistical transmission of an information message between a wheel electronics unit and the central electronic control unit, resulting in even lower energy efficiency.

The present invention proposes a transmission method applicable to one or more radio signals between a moving wheel electronics unit of a vehicle and a fixed central electronic control unit of said vehicle, or TPMS protocol, which can at least optimize the energy consumption for a given performance level, and advantageously improve the transmission performance. Improving the transmission performance is a matter of ensuring that the transmitted radio signals can be statistically received by the receiving electronic unit within a specified minimum time interval, even in the presence of at least one shadow area, regardless of the speed of the vehicle, up to a specified maximum speed, for example 250 km/h.

In fact, in the case of transmission from the wheel electronics unit toward the central electronic control unit, the signal transmission energy is supplied by the wheel electronics unit, that is to say by a stand-alone energy source included in the wheel electronics unit, such as a lithium battery, an energy collection mechanism, or the like. In the case of a battery, this must be changed when all its available energy has been used up. In order to prolong the life of the battery, it is useful to reduce the energy consumed in the transmission of signals toward the central electronic control unit. In the case of an energy collection mechanism, the collected energy is necessarily limited, so that an energy constraint is present, and it is useful to reduce the energy consumption of the wheel unit.

More precisely, the invention consists in a method for transmitting a radio signal between a moving wheel electronics unit of a vehicle and a fixed central electronic control unit of said vehicle, comprising the following steps:

detecting from the wheel electronics unit, during a rotation of the wheel, information defining a given angular position of said wheel at a given instant, and defining an angular reference point of the wheel based on said information, which is fixed relative to the wheel and corresponds to said given angular position, establishing the transmission of said radio signal between the wheel electronics unit and the central electronic control unit, in such a way that said signal is transmitted at a predetermined angular position of the wheel, calculated on the basis of said angular reference point, transmitting a plurality of successive radio signals between the wheel electronics unit of a vehicle and the fixed central electronic control unit of said vehicle, wherein each signal of said plurality of successive signals is transmitted at a different predetermined angular position of the wheel, calculated on the basis of said angular reference point which is fixed relative to the wheel, additionally defining a division of one revolution of the wheel into successive basic sectors using an angular reference point, the step of establishing transmission of a plurality of successive radio signals between the wheel electronics unit and the central electronic control unit being carried out in such a way that each said signal of said plurality of signals is transmitted at a predetermined angular position of the wheel, calculated on the basis of an angular reference point and on the basis of said division of the wheel into sectors, characterized in that it further comprises the following steps:

a measurement is made of the time elapsed between the position of the wheel electronics unit at an angular reference point of the wheel on the one hand and an identical position of the wheel electronics unit in the next revolution of the wheel on the other hand, enabling an angular rotation speed of the wheel to be calculated, a minimum wheel rotation sector required for the transmission time of a signal between the wheel electronics unit and the central electronic control unit is determined, at the calculated angular rotation speed of the wheel, and an angular offset of transmission between a first signal and a second signal following the first signal is determined, with respect to the angular reference point, as being equal to the smallest multiple of the basic division sector which covers the time required for transmission of said first radio signal at the calculated angular rotation speed.

The information obtained from the wheel electronics unit, defining a given angular position of the wheel at a given instant, is supplied in a known way by a wheel unit equipped, for example, with an accelerometer or an impact sensor, or a bending sensor or more generally a sensor based on piezoelectric technology, so that the position in which the wheel unit in the wheel is fitted on the vehicle, or the contact patch of the tire on the ground, can be known. In the present invention, this information is re-assigned from its original purpose, to be linked with the function of transmitting a message between the wheel electronics unit and the central electronic control unit, in order to establish a radial angular reference point for the wheel, which does not revolve with the wheel electronics unit, and which can be used to check the position angle at a given instant of the wheel electronics unit at which a signal will be transmitted. Thus the transmission of signals between a wheel electronics unit and the central electronic control unit can be carried out in a more targeted way over a wheel revolution, and makes it possible, for example, to distribute the signal transmissions over a wheel revolution with equal probability, thereby ensuring that the receiver receives the information within an optimized predetermined time interval.

A given angular position of the wheel is equivalent to a given angular position of the wheel electronics unit fixed to the wheel. The angular reference point is thus closely linked to the precise angular position at which the wheel electronics unit is located when it is defined, since it has originated from the wheel electronics unit itself. This angular reference point can be defined on each wheel revolution by the event undergone by the wheel electronics unit from which it has originated. For example, if the information comes from the contact patch of the tire on the ground, it may be, notably, the angle corresponding to the instant at which the wheel electronics unit comes into contact (via the tread) with the ground, or at the instant when it departs from it. In the case of an accelerometer fitted in the electronic unit fixed to the wheel and therefore rotating with the latter, the information may be reference instants at which the wheel electronics unit is located, for example, at the upper or lower rotation points.

For example, to return to the terminology of TPMS protocols described above, the plurality of successive signals advantageously corresponds here to a plurality of trains or bursts, each comprising a single signal or frame.

The division into sectors, using as its reference the radial angular reference point, enables the signals to be transmitted, respectively, to positions based on the sectors, that is to say known positions distributed over a wheel revolution. Thus it is certain that the signal transmission will be monitored over the wheel revolution and not completely random. Consequently, transmission is assured regardless of the possible presence of a shadow area whose location is unknown, within a specified period, since the whole of the wheel revolution is certain to be reached or covered by the transmissions. In most cases, as explained below with the aid of exemplary embodiments of the method according to the invention, it is certain that at least one basic sector per wheel revolution will be outside the shadow area and will allow the signal to be transmitted, provided that the angular duration of the transmission of the frame is correctly defined as being considerably smaller than one wheel revolution at the maximum speed of the vehicle.

The characterizing part of the method as stated above makes it possible to define a sectoral distribution of the transmissions of successive signals which is adapted to the speed of the vehicle, or in other words is adapted to the rotation speed of the wheel. This is because, according to the rotation speed of the wheel, the transmission of a signal covers a more or less open wheel sector which may extend over a plurality of basic division sectors. This characterizing part makes it possible to define a sequence of transmission of successive signals which targets, for example, the transmission of a signal in one or more sectors not reached by the transmission of the preceding signal.

According to an advantageous characteristic, said wheel electronics unit comprises a means for detecting the moment when the tire tread of the wheel is in contact with the ground, or the contact patch of the wheel's tire on the ground, said information defining a given angular position of said wheel at a given instant which then relates to the contact patch of the wheel's tire on the ground.

The information obtained from the contact patch on the ground is produced in a known way to control functions or data relating to the load applied to said tire or to the wear of the tire. This is the preferred example of the means providing the information which defines a given angular position of the wheel at a given instant.

According to an advantageous characteristic of the above, said angular reference point is updated before the transmission of each signal of the plurality of successive radio signals.

This characteristic relates more particularly to information obtained from the contact patch of the tire on the ground. The reference point may advantageously be updated before each transmission of a radio signal, on the basis of the information received relating to the contact patch on the ground at this moment, which may include data relating to a specified dynamic situation of the vehicle. The updating of the angular reference point consists in updating the information defining the given angular position of the wheel at the instant immediately preceding the transmission of a signal. For example, if the instant when the electronics unit comes into contact with the ground (via the tire tread) is chosen, the corresponding radial angular reference point of the wheel is a function of the size of the contact patch on the ground, which is variable according to the load on the wheel.

According to another advantageous characteristic, said information defining a given angular position of said wheel at a given instant, relating to the contact patch of the wheel on the ground, is one of the instants chosen between the instant when the wheel electronics unit comes into contact with the ground (via the tire tread) and the instant when said wheel electronics unit departs from the ground (via the tire tread), defining a radial angular reference point of the wheel.

This choice of information is preferred, because it is one of the most economical in terms of energy.

According to another advantageous characteristic, said transmission of the signals of the plurality of successive radio signals is carried out according to a sequence defined in such a way that each of the basic sectors of the wheel is reached by the transmission of at least one signal of said plurality of signals.

This characteristic enables the transmitted signals to be distributed with equal probability over a wheel revolution, given that the signal transmission extends in time over a plurality of wheel revolutions, but that, whenever a signal is transmitted, it is transmitted in the wheel revolution concerned while reaching a specified basic sector, in order to ensure that n sectors are reached with n signals.

According to an advantageous characteristic of the foregoing, said transmission of the signals of the plurality of successive radio signals is carried out according to a sequence defined in such a way that said basic sectors of a wheel revolution are reached according to a predetermined division into sectors.

According to another advantageous characteristic of the foregoing, said transmission of the signals of the plurality of successive radio signals is carried out according to a sequence defined in such a way that said basic sectors of a wheel revolution are reached according to a random division into sectors.

Other characteristics and advantages will become apparent from the perusal of the following exemplary embodiments of a method according to the invention, accompanied by the attached drawings, these examples being provided for illustrative purposes and without limiting intent.

Figure 1:
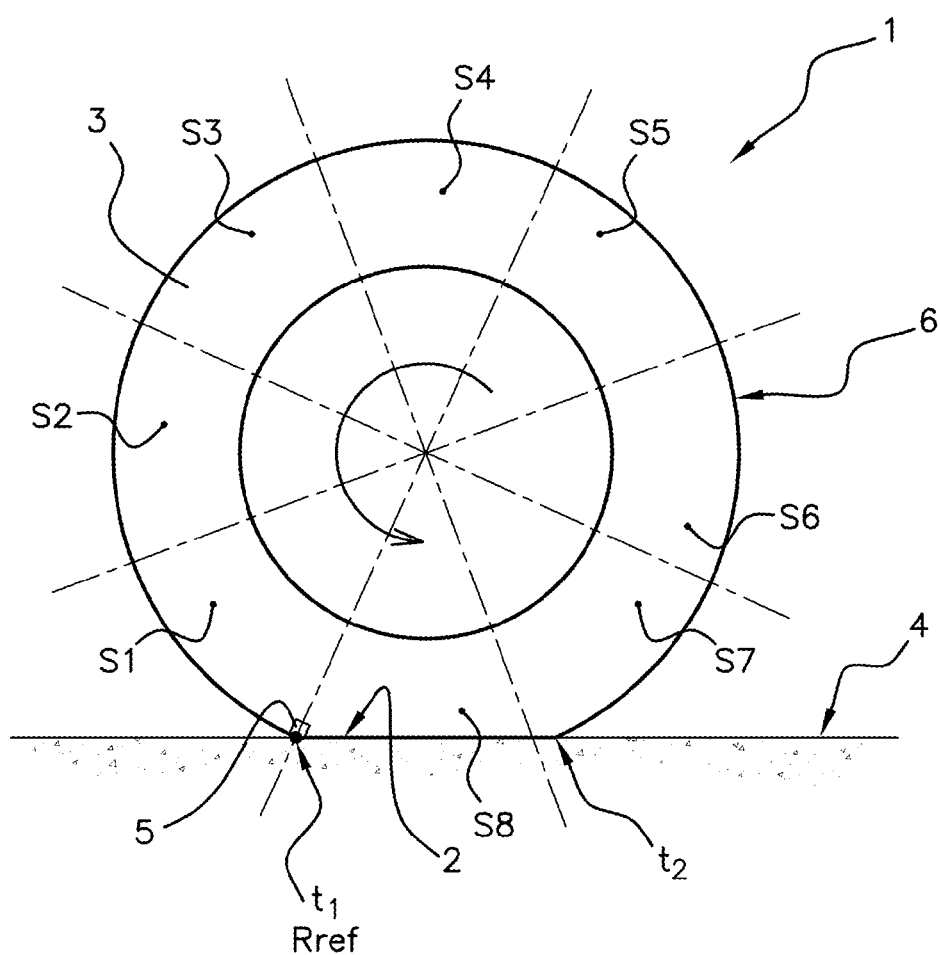
FIG. 1 shows in a schematic manner a vehicle wheel in a side view, on which examples of reference points and division into sectors according to the invention are shown.

FIG. 1 shows a wheel 1, which is one of the wheels supporting a vehicle (not shown) equipped with a tire pressure monitoring system or TPMS, further comprising a known means (not shown) for determining the contact patch 2 of the tire 3 on the ground 4. The TPMS which is described is of a generally known type, except as regards the method for transmitting a radio signal between a wheel electronics unit 5 of a vehicle and a fixed central electronic control unit or ECU (not shown) of the vehicle, which conforms to the present invention. Each wheel of the vehicle is equipped with its own wheel electronics unit, for the purpose of monitoring, at least, the pressure, the tire temperature of the wheel, and advantageously its contact patch on the ground. The wheel electronics unit 5 therefore comprises, in a known way, a means (not shown), for example an accelerometer or preferably an impact sensor, for the purpose of detecting the part of the tire tread 6 of the wheel 1 which is in contact with the ground 4, or the contact patch 2 of the tire 3 of the wheel 1 on the ground. The impact sensor is preferred, since it requires least energy for detecting information defining a given angular position of the wheel 1 at a given instant.

In FIG. 1, the part of the tread 6 of the tire 3 which is in contact with the ground 4 lies, within one wheel revolution, between the instant $t_1$ at which the tread comes into contact with the ground, and the instant $t_2$ at which the tread departs from the ground 4. The accelerometer or impact sensor which is fixed to the surface of the tread inside the wheel via the wheel electronics unit 5 detects these two instants $t_1$ and $t_2$ by the variation of acceleration or the induced impact.

The procedure for determining the contact patch 2 of the tire 3 on the ground 4 is followed in a known manner and will not be detailed further here. This procedure consumes very little energy and its use will be advantageously reassigned in the context of the transmission method according to the invention.

In the context of the present invention, by way of example, the instant $t_1$ or $t_2$, for example $t_1$, is therefore chosen as the given instant for the purpose of detecting the information defining a given angular position of the wheel 1 at this given instant, obtained from the wheel electronics unit 5, to define a radial angular reference point $R_{ref}$ of the wheel, based on this information, fixed with respect to the wheel and corresponding to this given angular position, that is to say passing through the point corresponding to the instant $t_1$.

Thus the transmission method comprises the following steps:

detecting information obtained from the wheel electronics unit 5, relating to the contact patch 2 of the tire 3 of the wheel 1 on the ground 4, and defining a radial angular reference point $R_{ref}$ of the rotating wheel, based on the information relating to the contact patch 2, and establishing the transmission of a radio signal between the electronics unit 5 of the rotating wheel 1 and the central electronic control unit, in such a way that the signal is transmitted at a predetermined angular position of the wheel, calculated on the basis of the angular reference point $R_{ref}$.

The angular reference point $R_{ref}$ is preferably a radial reference point and can be considered as fixed or substantially fixed with respect to the rotating wheel, because it is obtained from the contact patch on the ground which is itself fixed or substantially fixed with respect to the rotating wheel.

As mentioned above, the information obtained from the wheel electronics unit 5, relating to the contact patch 2 of the tire 3 on the ground 4, may for example be the instant $t_1$ when the wheel electronics unit 5 comes into contact with the ground (via the tire tread), as shown in FIG. 1, defining an angular reference point $R_{ref}$ at the front end of the contact patch, or alternatively the instant $t_2$ when the wheel electronics unit 5 departs from the ground (via the tire tread), defining a radial angular reference point $R_{ref}$ of the wheel at the rear end of the contact patch 2.

Establishing the transmission of a first radio signal containing a given information message between the electronics unit 5 of the rotating wheel 1 and the central electronic control unit, for example in the direction from the electronics unit 5 of the wheel 1 toward the central electronic control unit, may consist in sending this first signal at the position of the angular reference point $R_{ref}$, immediately after the fixing of this point.

To ensure correct reception of the signal by the receiving unit, the transmission method advantageously consists in transmitting a plurality or train of successive radio signals between the wheel electronics unit 5 of the vehicle and the fixed central electronic control unit of this vehicle. By way of example, a signal may be identified as a frame and the plurality of signals may be identified as a plurality of trains or bursts, each containing a single signal. With reference to the terminology defined above, each signal of the plurality of signals, as defined here, therefore corresponds to a burst containing a frame, that is to say a single signal.

Each signal of the plurality or train of successive signals is transmitted according to the invention at a predetermined angular position of the wheel 1, calculated on the basis of an angular reference point $R_{ref}$ which is fixed relative to the wheel.

For the transmission of successive signals, on the basis of an angular reference point $R_{ref}$ located at the front end of the contact patch for example, as shown in FIG. 1, the electronics unit 5 of the wheel 1 detects two successive instants $t_1$ as defined above, defining a complete revolution of the wheel 1, and calculates the time separating these two instants. This gives the radial speed of the wheel. For the purpose of proceeding with the division into sectors as detailed below, the time separating two successive instants $t_1$ may be divided into a given predetermined number of equal periods, which defines and is equal to the number of basic division sectors for one revolution of the wheel 1.

The angular reference point $R_{ref}$ is preferably updated before the transmission of each signal of the plurality or train of successive radio signals, as explained above. Preferably, when a second signal following the first is transmitted, in the example of the second burst, the instant $t_1$ is updated before the transmission of the second signal, and the same division into sectors is applied as for the first signal, that is to say the same number of division sectors of one wheel revolution. Evidently, the angular reference point $R_{ref}$ is preferably the same, in theory, for the transmission of all the signals of a plurality of signals. The purpose of this is to ensure that the calculation of the angular offsets of transmission of the signals of the same plurality of signals has the same origin. In practice, in the example, information relating to the tire contact patch on the ground being chosen to define the angular reference point $R_{ref}$, this angular reference point may easily be moved from one transmission to another, without causing any substantial deviation from the division into sectors chosen for all the transmissions of signals of the same plurality of signals.

Preferably, therefore, as indicated above, the method described here comprises a step in which a division of a revolution of the wheel 1 into successive basic sectors on the basis of the angular reference point $R_{ref}$ is also defined. When this division has been determined, it is also preferably applied to each angular reference point $R_{ref}$ updated before each transmission of a signal of the signal train. It should be noted that the wheel electronics unit covers a given sector in a time which is a function of the angular speed of the wheel.

The step of establishing transmission of a plurality of successive radio signals between the electronics unit 5 of the wheel 1 and the central electronic control unit is preferably carried out in such a way that each signal of the plurality of signals is transmitted at a predetermined angular position of the wheel 1, calculated on the basis of the current angular reference point $R_{ref}$ at the moment of transmission, and also, preferably, on the basis of the division of the wheel 1 into sectors as indicated above.

The division of the wheel 1 into basic sectors consists, for example, in measuring the time taken for the wheel electronics unit 5 to travel between two instants based on the information relating to the contact patch, for example two successive instants $t_1$, or between two successive instants $t_2$ if this instant $t_2$ is chosen to define the angular reference point. In both cases, this travel time of a wheel revolution is subsequently divided into a plurality of equal time divisions, each corresponding to the travel time of one basic division sector. The first transmission of a signal takes place immediately after this division into sectors has been obtained.

Figure 2:
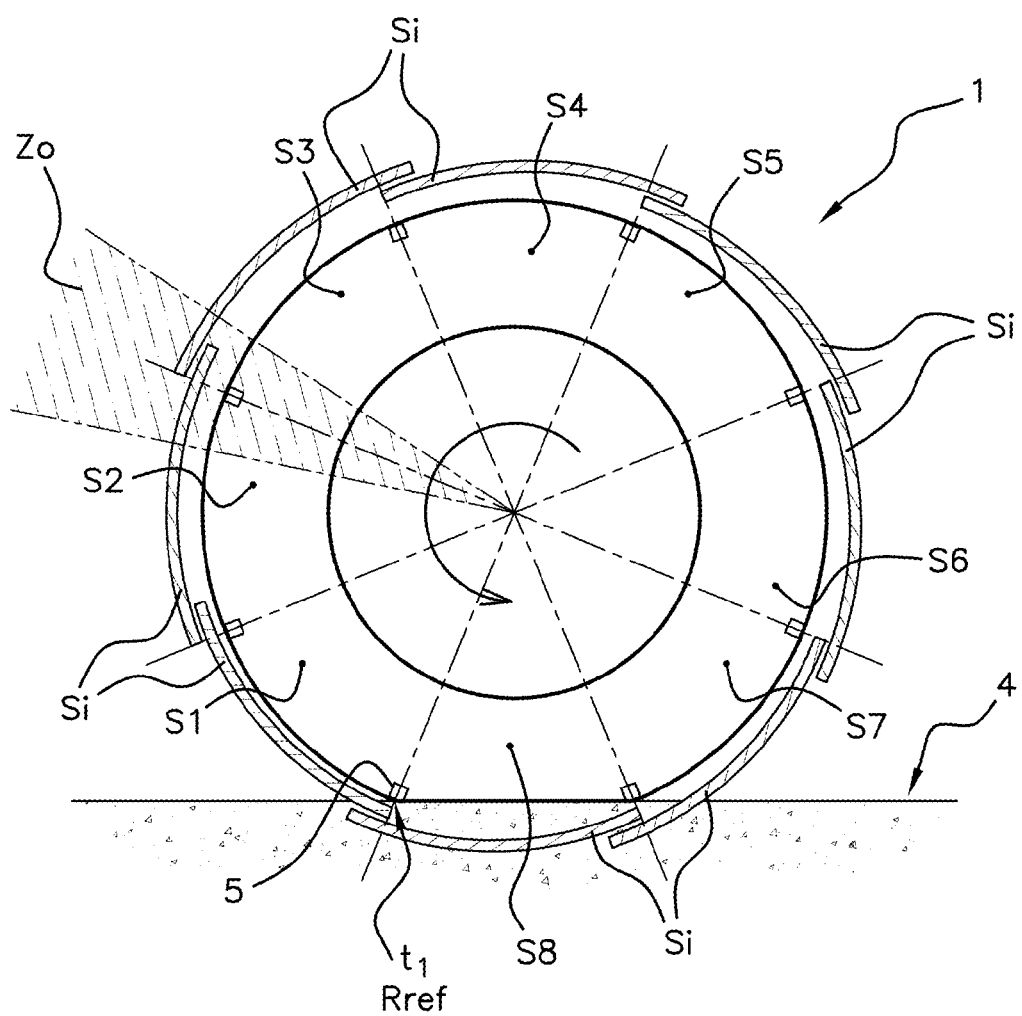
FIG. 2 shows in a schematic manner, on the basis of the example of FIG. 1, an example of signal transmission according to one embodiment of a method according to the invention.

The division of the wheel 1 into sectors is advantageously chosen (in terms of the number of sectors) so that the transmissions of successive signals extend in a certain manner over a wheel revolution, within the agreed period for information transmission according to the protocol or rules concerned, which depend on the type of information transmitted, while allowing for the time separating two successive signals. This division may, for example, consist of eight identical basic sectors, referenced as S1 to S8 as shown in FIG. 1, the respective aperture angle of each sector being 45°. In FIG. 2, the transmission of eight successive signals Si is represented by eight arcs of a circle. The angular duration of transmission of one of the signals Si corresponds to the length of the arc shown for the signal concerned. In FIG. 2, for the sake of simplicity, it is assumed that the wheel speed is identical during the transmission of each of the eight successive signals Si. In the transmission of each of the eight signals Si, the wheel electronics unit 5 is located at the transmission starting point of the signal Si concerned. FIG. 2 also shows, by way of example, an effective shadow area Zo in which no transmission takes place. For example, if a signal Si is transmitted at the start of each sector, as shown in FIG. 2 for example, with an interval of one minute between two successive signals Si, eight minutes will be required to cover the eight sectors. Some protocols require the assured transmission of a message in not more than ten minutes; a division into eight sectors results in transmission within a shorter period, which is therefore compatible with such a protocol. In the example of FIG. 2, the transmission of the signals emitted in sectors S2 and S3 fails, and therefore these signals are not received by the receiver of the central electronic control unit.

The time taken for the electronics unit 5 of the wheel 1 to complete a revolution is therefore divided, in the example, into eight equal intervals, each corresponding to the time taken for the wheel electronics unit 5 to cover a basic sector. The transmission of a signal in a given sector takes place, for example, at the start of the sector. The first sector S1 starts from the angular reference point $R_{ref}$.

Some examples of the implementation of the method as described above will now be described, based on the transmission by the wheel electronics unit 5 of a plurality of signals corresponding to a plurality of bursts of one frame (signal) each, every thirty seconds.

This means, in this case, for example, the transmission of eight signals (eight bursts) in the eight sectors of the wheel 1, respectively, with a time interval of 30 seconds between two successive signals. The angle of transmission of a signal may extend over a plurality of sectors, depending on the speed of the vehicle, the transmission of each signal of the plurality of signals starting at the start of a different sector. The transmissions of the eight signals are thus distributed with equal probability over the wheel revolution, as shown in FIG. 2 for example.

The transmission of the signals of the plurality of successive radio signals may be carried out, for example, in a sequence defined in such a way that the basic wheel sectors are reached according to a predetermined division into sectors. This predetermined division into sectors may, for example, be defined in such a way that the signal transmissions are distributed according to a chronological cycle by increasing order of the sectors taken one after another, or in a random or predetermined sequential order, as detailed below.

In a first example of application of the method described above, the following steps are executed:
- an angular reference point $R_{ref}$, fixed at an instant $t_1$, is established, after which, in the next wheel revolution, at the corresponding instant $t_1$, the division into sectors S1-S8 for example is established, as mentioned above,
- a first radio signal is sent at the reference position $R_{ref}$ that is to say at the start of the first sector S1,
- the system waits during the next transmission interval, 30 seconds in the example, before the transmission of the second signal,
- the angular reference point $R_{ref}$ is detected again, for example as mentioned above with the updating of the reference point $R_{ref}$, after which, in the next wheel revolution, at the corresponding instant $t_1$, the division into sectors S1-S8 for example is established as mentioned above, corresponding to the angular speed of the wheel at this moment,
- the second radio signal is sent at the calculated position corresponding to the updated reference position $R_{ref}$ with the addition of 45°, that is to say at the start of the second sector S2,
- the same procedure is then followed for the transmission of a third, fourth, fifth, sixth, seventh and eighth radio signal, at the start of the third S3, fourth S4, fifth S5, sixth S6, seventh S7 and eighth S8 sectors respectively,
- and when the eighth signal has been sent in the last sector S8, the transmission is recommenced from sector S1, since the pressure must be continuously monitored and the central electronic control unit must be informed again in less than ten minutes, according to a sliding time window.

This method can be extended to other values of division into sectors, which may, for example, be linked to the chosen vehicle speed or TPMS protocol.

In the first example of application, the described method can thus be used to divide the transmissions of radio signals with equal probability among the eight defined sectors, that is to say over the whole of a theoretical or geometrical revolution of the wheel. In fact, the transmissions will not have taken place in the same wheel revolution.

Thus it is possible to transmit in the different basic sectors in a cyclical manner in increasing order of basic sectors, for example in the sectors S1, S2, S3, S4, S5, S6, S7 and S8 successively as described above, or alternatively to transmit, according to a second example of application, in a predetermined cyclical manner according to a given division into sectors, for example in the sectors S2, S5, S8, S3, S6, S1, S4 and S7 successively, that is to say by transmitting once in every three sectors, or alternatively to transmit according to a third example of application in a random manner, for example in the sectors S1, S4, S2, S6, S7, S3, S5 and S8 successively.

By means of this angular referencing, it is possible to control the distribution of the signal transmissions between each wheel electronics unit and the central electronic control unit in a sectoral manner over a geometrical revolution for each wheel, and thus to ensure that, in the case of transmission from the wheel electronics units toward the central electronic control unit, the latter receives the transmitted information despite the presence of one or more shadow areas.

Preferably, the following supplementary steps may be added to the method described above:
- the time elapsed between the position of the electronics unit 5 of the wheel 1 at an angular reference point $R_{ref}$ of the wheel on the one hand, at the position corresponding to the instant $t_1$ in the example, and an identical position of the wheel electronics unit 5 in the next revolution of the wheel on the other hand, is measured for the purpose of calculating an angular rotation speed of the wheel 1,
- a minimum wheel rotation sector required for the transmission time of a signal between the wheel electronics unit 5 and the central electronic control unit is determined, at the calculated angular rotation speed of the wheel 1,
- and an angular offset of transmission between a first signal and a second signal following the first signal is determined, with respect to the angular reference point $R_{ref}$, as being equal to the smallest multiple of the basic division sector which covers the time required for transmission of said first radio signal at the calculated angular rotation speed of the wheel 1.

By way of illustration of the above description, for a vehicle traveling (legally) at 250 km/h fitted with a wheel having a 215/55 R16 tire, with a radio signal to be transmitted with a duration of 10 ms, we obtain an angle of rotation of the wheel corresponding to the complete transmission of the signal, or transmission sector, equal or substantially equal to 123° of revolution of the wheel, that is to say substantially equal to ⅓ of a wheel revolution. Thus, for a division of the wheel into eight sectors S1 to S8 as described above, and in the worst case, three of the eight sectors S1 to S8 may be affected by a break in transmission where a non-reception area is present during the revolution, resulting in a signal reception rate of 62.5%. This is because, if the transmission covering 123° of rotation of the wheel encounters a non-reception area with an angle of aperture of 10° for example, a maximum of three basic sectors (45° each) will be covered; consequently, three sectors will have been ineffective because the full signal is considered not to have been received. Based on a theoretical transmission interval of the eight successive signals of 30 seconds, and a successive cyclical ordering of the transmission in increasing order of the sector references considered one after another, corresponding to the sectors S1, S2, S3, S4, S5, S6, S7 and S8, this gives a maximum of two minutes without information at the central electronic control unit over the whole speed range from 0 to 250 km/h. In the worst case, with a shadow area in sector S4, the result is: S1 received, S2, S3 and S4 lost, S5 received, i.e. 4×30 s=2 mins.

If the above example is compared with a conventional system of periodic transmission once every minute, there are critical intermediate speeds (for example 66 km/h, 132 km/h, 198 km/h, etc.) where the three successive signals of a train (burst) of signals are sent in the same angular area, and there is no assurance that this phenomenon will not be repeated in the next train (burst) of signals. In the final analysis, therefore, in a window of two or three minutes, it is possible that the central electronic control unit will have received only a single train of signals, although this cannot be guaranteed 100%.

Using a protocol of predetermined successive cyclic transmissions, in sectors S2, S5, S8, S3, S6, S1, S4 and S7 for example, the transmission method described above can be improved, by a first optimization, by making it less sensitive at high speeds to the shadow areas and to the extended angular duration of transmission of a signal.

In fact, on the basis of the above example, the distance or aperture of three successive sectors corresponds to an angular offset of 135°, making it possible to "skip" a shadow area in two successive transmissions and thus make the information more readily available at the central electronic control unit. In the worst case, there would be a change from an item of information every two minutes to an item of information every minute. The energy balance with the protocol according to the first optimization, and the transmission of a signal train every thirty seconds, provides a gain of 33%, with an item of information guaranteed at the receiving unit every minute when one shadow area with a maximum aperture of about 10° is present in each wheel revolution.

A second optimization is that of increasing the periodic transmission in steady running to 45 seconds while retaining the protocol described above. In fact, on the basis of the preceding example, the angular distance or aperture of three successive sectors corresponds to an angular offset of 135°, making it possible to "skip" a shadow area in two successive transmissions and thus make the information more readily available at the central electronic control unit. In the worst case, there would be a change from an item of information every two minutes to an item of information every 1.5 minutes. The energy balance with the protocol according to the second optimization, with the transmission of a signal train or burst every 45 seconds, provides a gain of 55%, with an item of information guaranteed at the receiving unit every one and a half minutes, when one shadow area with a maximum aperture of about 10° is present in each wheel revolution.

A third optimization is that of adjusting the cyclical transmission protocol on the basis of the vehicle speed, calculated on the basis of the detected contact patch for example. Thus the angular difference between two transmissions of trains can be adjusted for low vehicle speeds and also for speeds above 250 km/h, so that the system can provide the same performance as long as the angular duration of the signal of a train does not exceed 50% of a wheel revolution.

A fourth optimization is that of adjusting the intervals of transmission of a single signal on the basis of the phases of the vehicle, namely low speed, mean or stabilized speed, and high speed.

The invention claimed is:

1. A method for transmitting a radio signal between a moving electronics unit (5) of a wheel (1) of a vehicle and a fixed central electronic control unit of said vehicle, comprising the following steps:

detecting from the wheel electronics unit, during a rotation of the wheel, information defining a given angular position of said wheel at a given instant, and defining an angular reference point ($R_{ref}$) of the wheel based on said information, which is fixed relative to the wheel and corresponds to said given angular position, then establishing a transmission of said radio signal between the wheel electronics unit (5) and the central electronic control unit, in such a way that said signal is transmitted at a predetermined angular position of the wheel, calculated on the basis of said angular reference point ($R_{ref}$), transmitting a plurality of successive radio signals between the wheel electronics unit of a vehicle and the central electronic control unit, wherein each signal of said plurality of successive signals is transmitted at a different predetermined angular position of the wheel, calculated on the basis of an angular reference point which is fixed relative to the wheel, additionally defining a division of one revolution of the wheel into successive basic sectors (S1-S8) using an angular reference point ($R_{ref}$), the step of establishing transmission of a plurality of successive radio signals between the wheel electronics unit and the central electronic control unit being carried out in such a way that each said signal of said plurality of signals is transmitted at a predetermined angular position of the wheel, calculated on the basis of an angular reference point and on the basis of said division of the wheel into sectors, wherein the method further comprises the following steps:

the time elapsed between the position of the electronics unit (5) of the wheel (1) at an angular reference point ($R_{ref}$) of the wheel, and an identical position of the wheel electronics unit (5) in the next revolution of the wheel, is measured for the purpose of calculating an angular rotation speed of the wheel, a minimum wheel rotation sector required for a transmission time of a signal between the wheel electronics unit and the central electronic control unit is determined, at the calculated angular rotation speed of the wheel, and an angular offset of transmission between a first signal and a second signal following the first signal is determined, with respect to the angular reference point ($R_{ref}$), as being equal to the smallest multiple of the basic division sector (S1-S8) which covers the time required for transmission of said first radio signal at the calculated angular rotation speed.

2. The transmission method as claimed in claim 1, wherein said wheel electronics unit (5) comprises a means for detecting the moment when the tread (6) of the tire (3) of the wheel is in contact with the ground (4), or the contact patch (2) of the wheel's tire on the ground, and wherein said information defining a given angular position of said wheel at a given instant relates to the contact patch (2) of the wheel's tire (3) on the ground.

3. The transmission method as claimed in claim 2, wherein said angular reference point ($R_{ref}$) is updated before the transmission of each signal of the plurality of successive radio signals.

4. The transmission method as claimed in claim 2, wherein said information defining a given angular position of said wheel at a given instant, relating to the contact patch (2) of the tire (3) of the wheel on the ground, is one of the instants chosen between the instant ($t_1$) when the wheel electronics unit comes into contact with the ground and the instant ($t_2$) when said wheel electronics unit departs from the ground, defining a radial angular reference point ($R_{ref}$) of the wheel.

5. The transmission method as claimed in claim 2, wherein said transmission of the signals of the plurality of successive radio signals is carried out according to a sequence defined in such a way that each of the basic sectors (S1-S8) of a revolution of the wheel is reached by the transmission of at least one signal of said plurality of signals.

6. The transmission method as claimed in claim 5, wherein said transmission of the signals of the plurality of successive radio signals is carried out according to a sequence defined in such a way that said basic sectors (S1-S8) of a wheel revolution are reached according to a predetermined division into sectors.

7. The transmission method as claimed in claim 5, wherein said transmission of the signals of the plurality of successive radio signals is carried out according to a sequence defined in such a way that said basic sectors (S1-S8) of a wheel revolution are reached according to a predetermined division into sectors.

8. The transmission method as claimed in claim 1, wherein said angular reference point ($R_{ref}$) is updated before the transmission of each signal of the plurality of successive radio signals.

9. The transmission method as claimed in claim 8, wherein said information defining a given angular position of said wheel at a given instant, relating to the contact patch (2) of the tire (3) of the wheel on the ground, is one of the instants chosen between the instant ($t_1$) when the wheel electronics unit comes into contact with the ground and the instant ($t_2$) when said wheel electronics unit departs from the ground, defining a radial angular reference point ($R_{ref}$) of the wheel.

10. The transmission method as claimed in claim 8, wherein said transmission of the signals of the plurality of successive radio signals is carried out according to a sequence defined in such a way that each of the basic sectors (S1-S8) of a revolution of the wheel is reached by the transmission of at least one signal of said plurality of signals.

11. The transmission method as claimed in claim 10, wherein said transmission of the signals of the plurality of successive radio signals is carried out according to a sequence defined in such a way that said basic sectors (S1-S8) of a wheel revolution are reached according to a predetermined division into sectors.

12. The transmission method as claimed in claim 10, wherein said transmission of the signals of the plurality of successive radio signals is carried out according to a sequence defined in such a way that said basic sectors (S1-S8) of a wheel revolution are reached according to a predetermined division into sectors.

13. The transmission method as claimed in claim 1, wherein said information defining a given angular position of said wheel at a given instant, relating to the contact patch (2) of the tire (3) of the wheel on the ground, is one of the instants chosen between the instant ($t_1$) when the wheel electronics unit comes into contact with the ground and the instant ($t_2$) when said wheel electronics unit departs from the ground, defining a radial angular reference point ($R_{ref}$) of the wheel.

14. The transmission method as claimed in claim 1, wherein said transmission of the signals of the plurality of successive radio signals is carried out according to a sequence defined in such a way that each of the basic sectors (S1-S8) of a revolution of the wheel is reached by the transmission of at least one signal of said plurality of signals.

15. The transmission method as claimed in claim 14, wherein said transmission of the signals of the plurality of successive radio signals is carried out according to a sequence defined in such a way that said basic sectors (S1-S8) of a wheel revolution are reached according to a predetermined division into sectors.

16. The transmission method as claimed in claim 14, wherein said transmission of the signals of the plurality of successive radio signals is carried out according to a sequence defined in such a way that said basic sectors (S1-S8) of a wheel revolution are reached according to a predetermined division into sectors.

* * * * *